(12) United States Patent
Wang et al.

(10) Patent No.: US 8,489,885 B2
(45) Date of Patent: Jul. 16, 2013

(54) METHOD AND DEVICE FOR MANAGING DIGITAL CONTENT

(75) Inventors: Changjie Wang, Shangai (CN); Fulong Ma, Shanghai (CN); Hui Li, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 84 days.

(21) Appl. No.: 13/129,139

(22) PCT Filed: Nov. 9, 2009

(86) PCT No.: PCT/IB2009/054954
§ 371 (c)(1),
(2), (4) Date: May 13, 2011

(87) PCT Pub. No.: WO2010/058317
PCT Pub. Date: May 27, 2010

(65) Prior Publication Data
US 2011/0219236 A1  Sep. 8, 2011

(30) Foreign Application Priority Data

Nov. 20, 2008  (CN) .......................... 2008 1 0178639

(51) Int. Cl.
*H04L 9/08* (2006.01)
(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | |
|---|---|---|---|
| 7,191,332 B1 | 3/2007 | Pankajakshan et al. | |
| 7,290,699 B2 | 11/2007 | Reddy et al. | |
| 7,320,140 B1 | 1/2008 | Boyer et al. | |
| 7,363,499 B2 | 4/2008 | Perlman | |
| 7,370,196 B2 | 5/2008 | Simon | |
| 2004/0184616 A1* | 9/2004 | Morten | 380/285 |
| 2007/0022306 A1 | 1/2007 | Lindsley | |
| 2007/0220610 A1 | 9/2007 | Van Loenen et al. | |

FOREIGN PATENT DOCUMENTS

| | | |
|---|---|---|
| EP | 1693731 A1 | 8/2006 |
| WO | 9858306 A1 | 12/1998 |
| WO | 02067548 A1 | 8/2002 |

* cited by examiner

*Primary Examiner* — Kambiz Zand
*Assistant Examiner* — Aubrey Wyszynski

(57) ABSTRACT

The invention provides a method and devices for managing digital content, the method comprising the steps of sending, by a first device (21), an encrypted content key (202) to a second device (22); sending, by said second device (22) to a third device (23), a license data describing the rights to use said digital content by said third device (23) in response to a request from said third device (23) to use said digital content, wherein said license data includes said encrypted content key (202); and receiving, by said third device (23) from said first device (21), data for decrypting said encrypted content key (202).

15 Claims, 3 Drawing Sheets

METHOD AND DEVICE FOR MANAGING DIGITAL CONTENT

FIELD OF THE INVENTION

The invention relates generally to information technology. More particularly, the present invention relates to digital content management.

BACKGROUND OF THE INVENTION

DRM (Digital Rights Management) is a way to protect digital content from unauthorized use. In a known scenario of a DRM application, as shown in FIG. 1, there are a couple of roles involved, named content provider device 101 (hereinafter referred to as CP), right issuer device 102 (hereinafter referred to as RI) and client device 103 (hereinafter referred to as CD). To buy (i.e. access/use . . . ) a piece of digital content, CD 103 first connects to CP 101 via a network 104 so as to get (by download online or by other offline methods) an encrypted version of said digital content. Then, CD 103 connects to RI 102 to make the payment and obtains a license data authorizing access to the digital content. A content key is included in the license data for decrypting the digital content. Usually, the license data is encrypted by RI 102 with the secret key of CD 103 so that only CD 103 can retrieve the content key to decrypt the digital content. In this scenario, the content key for decryption is shared between CP 101 and RI 102, and such a scenario is suitable in situations in which CP and RI are implemented by "parties" trusting each other (e.g. CP is implemented in a first entity, RI is implemented in a second entity, both of which are operated by a big company).

Publishing digital content by a person/individual or by a small company has its own features which are different from the scenario of publishing digital content by a big company. When a maker of content is a person or a small company, he can only play the role of CP, and often has a website/server to publish the content, but the maker of content has no capability to provide the DRM service and therefore has to seek a separate entity to act as RI. In this case, CP and RI are independent entities, i.e. they have their own interests and therefore do not necessarily trust each other. For example, RI would like to control how many protected copies CP has published and wants to charge the commission accordingly. CP would like to keep his own content from being accessed by RI.

Thus, there is a need to meet the requirements of both CP and RI when these are independent entities.

OBJECT AND SUMMARY OF THE INVENTION

It is an object of the invention to propose improved methods for managing digital content.

The improved methods are implemented by CP, RI, and CD. In the following description, the first device corresponds to CP, the second device corresponds to RI, and the third device corresponds to CD.

According to the first aspect of the invention, a method for managing digital content performed by a first device is provided. In this method, said digital content is encrypted with a content key by said first device. The method comprises the steps of encrypting said content key by said first device so as to generate an encrypted content key; and sending said encrypted content key by said first device to a second device, wherein said encrypted content key is intended to be included in a license data to be sent by said second device to a third device in response to a request from said third device to use said digital content, said license data describing the rights to use said digital content by said third device.

According to the second aspect of the invention, a method for managing digital content performed by a second device is provided. In this method, said digital content is encrypted with a content key by a first device, and said content key is encrypted by said first device so as to generate an encrypted content key. The method comprises the steps of receiving, by a second device, the encrypted content key from said first device; and sending, by said second device to a third device, a license data describing the rights to use said digital content by said third device in response to a request from said third device to use said digital content, wherein said license data includes said encrypted content key.

According to the third aspect of the invention, a method for managing digital content performed by a third device is provided. In this method, said digital content is encrypted with a content key by a first device, said content key is encrypted by said first device so as to generate an encrypted content key, and said encrypted content key is sent by said first device to a second device. The method comprises the steps of sending, by said third device to said second device, a request to use said digital content; receiving, by said third device from said second device, a license data describing the rights to use said digital content by said third device, wherein said license includes said encrypted content key; and receiving, by said third device from said first device, data for decrypting said encrypted content key.

According to the fourth aspect of the invention, a first device for managing digital content is provided. In this first device, said digital content is encrypted with a content key by said first device. The first device comprises a unit for encrypting said content so as to generate an encrypted content key; and a unit for sending said encrypted content key to a second device, wherein said encrypted content key is intended to be included in a license data to be sent by said second device to a third device in response to a request from said third device to use said digital content, said license data describing the rights to use said digital content by said third device.

According to the fifth aspect of the invention, a second device for managing digital content is provided. In this second device, said digital content is encrypted with a content key by a first device, and said content key is encrypted by said first device so as to generate an encrypted content key. The second device comprises a unit for receiving the encrypted content key from said first device; and a unit for sending, to a third device, a license data describing the rights to use said digital content by said third device in response to a request from said third device to use said digital content, wherein said license data includes said encrypted content key.

According to the sixth aspect of the invention, a third device for managing digital content is provided. In this third device, said digital content is encrypted with a content key by a first device, said content key is encrypted by said first device so as to generate an encrypted content key, and said encrypted content key is sent by said first device to a second device. The third device comprises a unit for sending a request to use said digital content to said second device; a unit for receiving, from said second device, a license data describing the rights to use said digital content by said third device, wherein said license includes said encrypted content key; and a unit for receiving, from said first device, data for decrypting said encrypted content key.

Since the content key is encrypted, the RI device is not able to access the digital content, but it can still perform the license data service. Thus, a CP who is independent of a RI can use the service from RI and does not need to share the content key with RI.

BRIEF DESCRIPTION OF THE DRAWINGS

The above and other objects and features of the present invention will become more apparent from the following detailed description of various aspects of the invention with reference to the accompanying drawings, in which.

DESCRIPTION OF EMBODIMENTS

In the present invention, it is assumed that CP keeps the content key for decrypting a given encrypted digital content; CP needs RI help to release the license data; and RI is an independent entity providing DRM service to CP.

Figure 1:
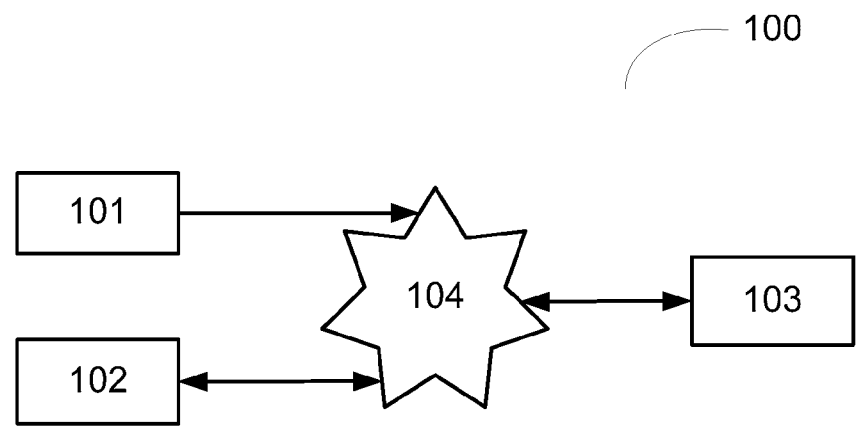
FIG. 1 is a schematic diagram showing a known DRM system.
Figure 2:
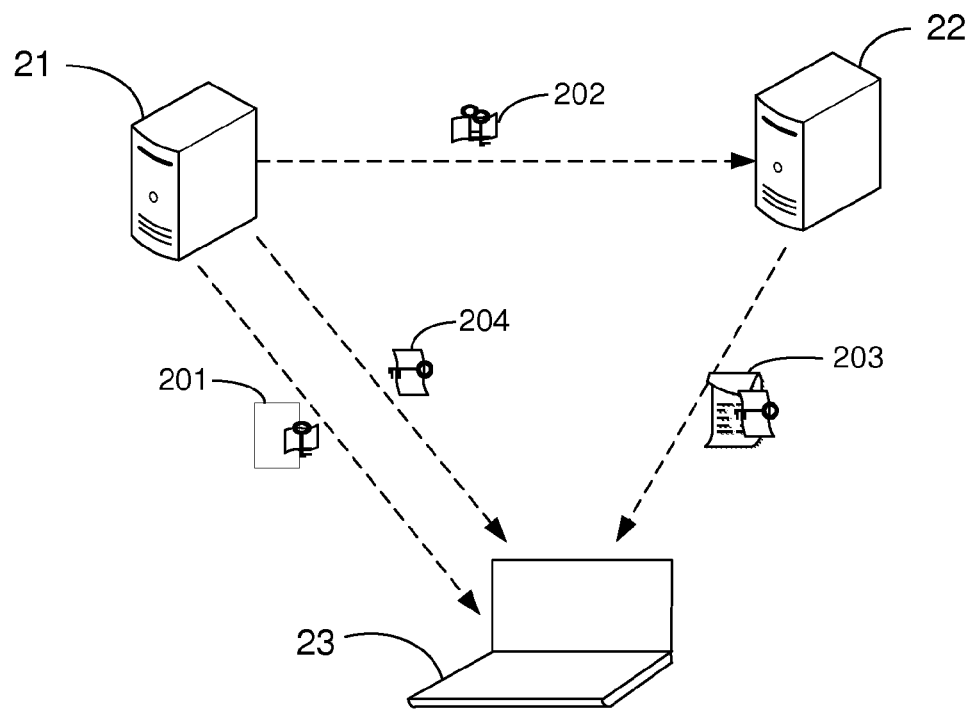
FIG. 2 shows a system for managing digital content according to the invention.

FIG. 2 shows a system for managing digital content according to the invention. The system comprises a first device 21, a second device 22, and a third device 23. The first device 21, the second device 22, and the third device 23 are capable of communicating with each other via a wired or a wireless network.

The first device 21 is a CP which is capable of encrypting digital content and publishing the encrypted digital content. The first device 21 may correspond, for example, to a personal computer. The second device 22 is a RI which is capable of generating and releasing license data to CD. For example, the second device 22 may correspond to a server. The third device 23 is a CD which needs to use the digital content. The third device 23 may correspond to a personal computer.

The principle of the invention is to send, by the first device 21, an encrypted content key 202 to the second device 22; the second device 22 releases a license data 203 including the encrypted content key 202 to the third device 23 upon request of the third device 23; the third device 23 thus obtains the license data 203 from the second device 22; and then the third device 23 receives data 204 from the first device 21 for decrypting the encrypted content key 202. A detailed description of the steps performed by the first device 21, the second device 22, and the third device 23 is given below.

Figure 3:
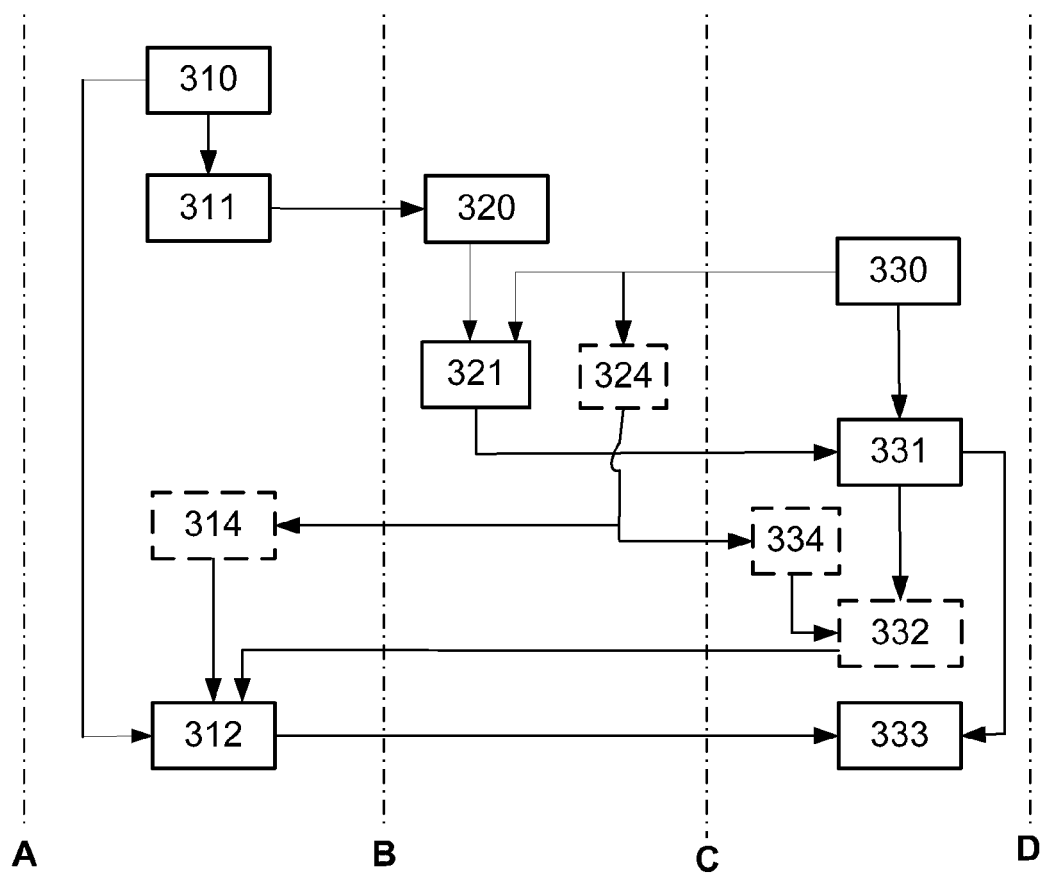
FIG. 3 is a flow chart for managing digital content according to the invention.

As shown in FIG. 3, a block represents a step; the broken-line block indicates that the step is an optional step; an arrow-headed line represents the data-transmitting path. On the one hand, data is the result of the last step (e.g. output of the last step), and, on the other hand, data is the input of the next step.

In FIG. 3, the first device 21 has a digital content and wants to publish the digital content by using the digital rights management system (DRM).

The digital content may represent any type of digital content, such as: video data (e.g. songs), audio data (e.g. movies), textual documents (e.g. articles, books, magazines or newspapers), and software (e.g. complete applications, upgrades, fixes), etc.

Before publishing the digital content, it is packaged by the first device 21 to create a digital content package. Packaging digital content includes encrypting the digital content with a content key, and adding a digital content header for describing the necessary information of the digital content, etc. The necessary information may be, for example, the content key ID, the IP address for obtaining the license data, etc.

To encrypt the digital content, many conventional encryption methods can be used, for example, symmetrical or asymmetrical encryption algorithms. If a symmetrical encryption algorithm is used, only one key is used for encryption as well as decryption. If an asymmetrical encryption algorithm is used, a key pair is involved, namely, a private and a public key. Normally, the public key is used to encrypt the digital content, and the private key is used to decrypt the digital content.

Packaging digital content is well known in the art; therefore, no detailed description will be given here.

After the digital content has been packaged by the first device 21, it is published by the first device 21 via the Internet (for example, via a webpage) or via any movable storage (for example, CD, DVD, flash memory, etc).

According to the invention, a method performed by the first device 21 for managing the digital content is provided. The method comprises a step 310 of encrypting said content key by said first device 21 so as to generate an encrypted content key.

When the encrypted content key is generated, a step 311 of sending the encrypted content key by the first device 21 to the second device 22 is performed. The encrypted content key sent to the second device 22 is intended to be included in a license data to be sent by the second device 22 to the third device 23 in response to a request from said third device 23 to use said digital content, said license data describing the rights to use said digital content by said third device 23.

The encrypted content key may be sent directly from the first device 21 to the second device 22. It may also be sent to the second device 22 indirectly. For example, it may be uploaded (sent) to a predefined address so as to be downloaded by the second device 23. It is also possible not to send the encrypted content key but the encrypted content key ID (identification), and the second device 22 can generate an encrypted content key based on the encrypted content key ID. Similarly to sending the encrypted content key, the encrypted content key ID may also be sent to the second device 22 either directly or indirectly.

The sending step 311 refers to all situations, no matter whether the encrypted content key or the encrypted content key ID is sent directly or indirectly to the second device 22, because the final result is that the second device 22 obtains the encrypted content key from the first device 21.

Corresponding to the sending step 311, a step 320 of receiving, by the second device 22, the encrypted content key from said first device 21 is performed. Similarly to the sending step 311, the receiving step 320 also includes all situations as long as the encrypted content key is obtained by the second device 22, no matter whether it is obtained directly from the first device 21 or indirectly.

When the third device 23 obtains the encrypted digital content, a step 330 of sending, by the third device 23 to the second device 22, a request to use said digital content is performed.

The encrypted digital content can be obtained by the third device 23 by downloading from the Internet or from a movable storage. When the third device 23 tries to access the encrypted digital content, a trusted architecture component (typically referred to as DRM agent) installed in the third device will seek the content key from the license data for decrypting the encrypted digital content. If the DRM agent fails to find a license data for the digital content, the DRM agent of the third device 23 will control this device to send a request to use said digital content to the second device 22. As mentioned above, the IP address of the second device 22 for the third device 23 sending the request may be embedded in the header of the packaged digital content.

When the second device 22 receives a request from the third device 23 to use said digital content, the second device 22 authenticates the third device 23. If the third device 23 meets the requirement of using the digital content, for example, complete the payment, the second device 22 performs a step 321 of sending license data to the third device 23, said license data describing the rights to use said digital content by the third device 23 and including said encrypted content key.

The license data includes data for describing the rights to use the digital content and the encrypted content key for decrypting the digital content. The usage rights may be, for example, printing the digital content, or playing the digital content for a certain time or during a certain period.

In order to indicate where to get data for decrypting the encrypted content key, the license data sent by the second device 22 may include the IP address of the first device 21 so that the third device 23 can be directed to the first device 21 for decrypting the encrypted content key.

Corresponding to the sending step 321, the third device 23 performs a step 331 of receiving a license data from the second device 22.

Since the content key included in the license data is encrypted by the first device 21, the digital content cannot be decrypted by the third device 23 using the encrypted content key directly. The third device 23 first needs to have the encrypted content key decrypted.

Therefore, a step 312 of sending data for decrypting said encrypted content key by the first device 21 to said third device 23 is performed.

Optionally, depending on which encryption method is applied to encrypt the content key, the data sent to the third device 23 may be the decryption key for decrypting the encrypted content key; the data may also be a key seed for generating a decryption key by the third device 23.

For security, instead of sending any decryption key or key seed, the first device 21 may decrypt the encrypted content key directly for the third device 23. In this scenario, the data sent by the first device 21 is the decrypted content key (i.e. clean content key).

Before sending data for decrypting the encrypted content key to the third device 23, the data may be encrypted by the first device 21 using the public key of the third device 23 for ensuring a security data transmission. The public key of the third device 23 can be informed, for example, by the second device 22 or by the third device 23.

Corresponding to the sending step 312, a step 333 of receiving data for decrypting the encrypted content key is performed by the third device 23.

Optionally, to trigger the first device 21 to perform the sending step 312, the third device 23 may perform a step 332 of sending a message to the first device 21 for requesting the first device 21 to send data for decrypting said encrypted content key.

Optionally, it may also be the second device 22 which triggers the first device 21 to perform the sending step 312. The way in which the second device 22 triggers the first device to perform the sending step 312 will be described hereinafter.

Optionally, according to one embodiment of this invention, the second device 22 may perform a step 324 of sending information about the identifier of said digital content (referred to as "content ID"), the identifier of said third device 23 (referred to as "device ID") and the public key of said third device 23 after the sending step 321.

Optionally, the information may be sent to the first device 21; it may also be sent to the third device 23.

If the information is sent to the third device 23, this device performs a corresponding step 334 of receiving this information.

The information sent to the third device 23 may be included in the message sent in step 332 for requesting said first device 21 to send data for decrypting said encrypted content key. Including this information in the message sent in step 332 aims at providing proof that the third device 23 is authorized by the second device 22.

The information sent to the third device 23 may also be directly forwarded by the third device 23 to the first device 21 as the message for requesting the first device 21 to send data for decrypting said encrypted content key.

If the information is sent to the first device 21, corresponding to the sending step 324, the first device 21 further comprises a step 314 of receiving the afore-mentioned information.

The information sent to the first device 21 is used to notify this device of the fact that a license data for a digital content (the digital content ID of said digital content is included in said information) has been sent to the third device 23. When the first device 21 receives a message from the third device 23 for requesting the first device 21 to send data for decrypting the encrypted content key, the first device 21 can compare the device ID indicated in said information with the device ID requesting the data for decrypting the encrypted content key so as to verify if the requesting device is authorized by the second device 22.

The information sent to the first device 21 may also be used to trigger this device to perform the step 312 of sending data for decrypting the encrypted content. In this scenario, when the first device 21 receives this information, the first device 21 may connect to the third device 23 and send the data automatically without waiting for another request from the third device 23.

Advantageously, the information may be signed, for security, by the second device using its private key. When the other device (i.e. the first or the third device in the invention) receives this information, the other device can use the public key of the second device so as to verify the validity of this information.

In the known DRM system (for example, OMA) for transmitting the license data securely, an asymmetric encryption algorithm is used by RI to protect the license data, i.e. RI uses its private key to sign the license data and the public key of CD to encrypt the content key included in the license data. In this way, only the authorized CD can decrypt the content key.

In other words, when this invention is applied on the basis of the known DRM system, the content key is first encrypted by the first device 21, and the encrypted content key is then encrypted again by the second device 22, which can be represented by $E_2(E_1(CK))$, wherein $E_2(X)$ is understood to mean encryption of X by the second device 22, and $E_1(X)$ is understood to mean encryption of X by the first device 21. The DRM agent according to the known DRM system can use the private key of the third device 23 to decrypt $E_2(E_1(CK))$. The result of the decryption is $E_1(CK)$. However, since $E_1(CK)$ is still an encrypted content key, it cannot be used by the DRM agent directly. Even the third device 23 receives data for decrypting the encrypted content key, and since the known DRM agent does not have two decryption steps, it will not use the received data to decrypt the encrypted content key.

The encryption step performed by the first device 21 for encrypting the content key will hereinafter be referred to as the first encryption. The encryption step performed by the second device 22 for encrypting the encrypted content key will be referred to as the second encryption. Normally, if there is more than one decryption step for decrypting more than one encryption step, the order of the decryption steps will be: first decrypts the last encryption step, and last decrypts the first encryption step.

The invention further proposes a solution for adaptation to the known DRM system, which needs to exchange the order of two decryption steps. That is, the third device 23 should first decrypt the first encryption using the received data, and then send the result of this decryption to the known DRM agent; the known DRM agent can thus decrypt the second encryption. To allow this, the first and the second encryption should have a property of commutativity, and therefore the order of two decryption steps will be changed, which means that the first and the second encryption step meet the requirement of $E_2\{E_1(CK)\}=E_1\{E_2(CK)\}$, wherein $E_1(X)$ represents the first encryption on X, and $E_2(X)$ represents the second encryption on X. If this requirement can be met, when the third device 23 decrypts $E_2\{E_1(CK)\}$, it is equal to decrypting $E_1\{E_2(CK)\}$, and the decryption result will be $E_1\{E_2(CK)\}$. Then, $E_2(CK)$ will be sent to the DRM agent for the second decryption. The DRM agent can use the private key of the third device 23 to decrypt $E_2(CK)$ and obtain the cleaned content key. The third device 23 is thus capable of decrypting the digital content.

If the order of two decryption steps can be exchanged, it also makes it possible for the first device 21 to perform one decryption step.

Advantageously, the first device may use "blinding" as an encryption method to encrypt the content key, since "blinding" has a property of being commutative with certain encryption algorithms.

Blinding in the context of the invention is understood to mean a specific encryption method. It is a technique by which an agent can provide a service to (i.e. compute a function for) a client in an encoded form without knowing either the real input or the real output.

The most common application of blinding is the blind signature. In a blind signature protocol, the signer digitally signs a message without being able to learn its content.

When a blinding algorithm is used to encrypt the content key, the method according to one embodiment of the invention comprises the steps of blinding the content key by the first device 21 so as to generate a blinded content key; sending, by the first device 21, the blinded content key to a second device 22; sending, by the second device 22 to a third device 23, a license data describing the rights to use said digital content by the third device 23 in response to a request from the third device 23 to use said digital content, wherein said license data includes said blinded content key; and receiving, by said third device 23 from said first device 21, data for unblinding said blinded content key.

An example illustrating the commutativity of the first encryption step (blinding step) and the second encryption step is given below.

1. The first device 21 blinds the content key (CK) so as to generate a blinded content key (BCK).

$$BCK=(CK^{BF_{21}})\mod P, \quad (1)$$

wherein P is a large prime number, and $BF_{21}$, $UBF_{21}$ are chosen as blinding factor and unblinding factor, respectively, which satisfies:

$$BF_{21}*UBF_{21}=1 \mod P-1 \quad (2)$$

2. The second device 22 encrypts the blinded content key which is included in the license data and sent to the third device 23, which encrypted blinded content key is referred to as EBCK.

$$EBCK=(BCK^{e_{23}})\mod P \quad (3)$$

wherein $e_{23}$, $d_{23}$ are a set of RSA parameters which are used for the third device 23. For easy illustration, "mod P" is omitted in the following context.

3. To retrieve the content key CK, the third device 23 needs to first perform the unblinding step as the first decryption step and then perform the second decryption step on EBCK.

The unblinding step is:

$$EBCK^{UBF_{21}}=(BCK^{e_{23}})^{UBF_{21}}=((CK^{BF_{21}})^{e_{23}})^{UBF_{21}}=((CK^{e_{23}})^{BF_{21}})^{UBF_{21}}=CK^{e_{23}} \quad (4)$$

The decryption step is:

$$(CK^{e_{23}})^{d_{23}}=CK \quad (5)$$

Normally, a "blinding factor" is used to blind the data, and an "un-blinding factor" is used to unblind the data. The blinding and the unblinding factor satisfy a certain formula as illustrated in equation (2) above. Therefore, according to this formula, any one of the blinding factor or unblinding factor can be calculated so that both of these factors can be the data for unblinding the blinded content key.

Figure 4:
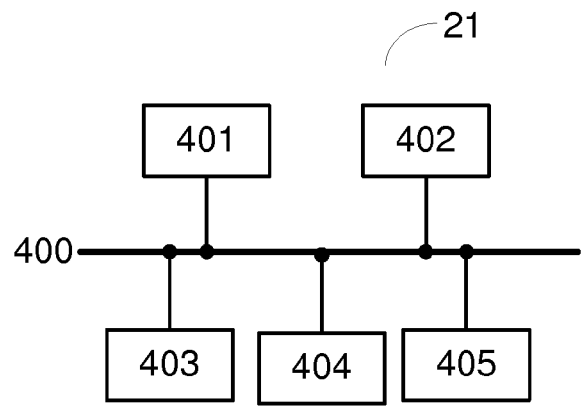
FIG. 4 is a block diagram of the first device according to the invention.

FIG. 4 is a block diagram of the first device 21 according to the invention for managing digital content. Line 400 represents the data bus of the first device 21 for exchanging data.

The first device 21 is a content provider comprising a packaging unit 401 for creating a digital content package. The first device 41 also comprises an encrypting unit 402 for performing the above-mentioned encryption step 310 so as to generate an encrypted content key.

The first device 21 also comprises a unit 403 for performing the above-mentioned step 311 of sending the encrypted content key, and a unit 405 for performing the above-mentioned step 312 of sending data for decrypting the encrypted content key.

The first device 21 also comprises a receiving unit 404 for receiving data, for example, performing the above-mentioned step 314 of receiving the message for requesting data for decrypting said encrypted content key.

As the explanation has already been given in the aforementioned method description, it will not be further dealt with here.

Figure 5:
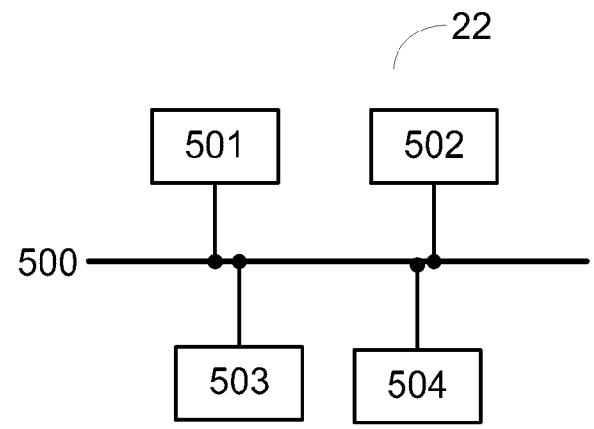
FIG. 5 is a block diagram of the second device according to the invention.

FIG. 5 shows a second device 22 for managing digital content in a digital rights management system according to the invention. The digital content is encrypted with a content key by the first device 21, and the content key is encrypted by said first device 21 so as to generate an encrypted content key. Line 500 represents the data bus of the second device 22 for exchanging data.

The second device 22 comprises a receiving unit 501 for receiving data from other devices, for example, performing the above-mentioned step 320 of receiving the encrypted content key from the first device 21, or, for example, receiving a request to use the digital content from the third device 23.

The second device 22 comprises a license generating unit 502 for generating a license data in response to a request from the third device 23 to use said digital content. As mentioned above, the license data describes the rights to use said digital content by said third device 23 and includes the received encrypted content key.

The second device 22 also comprises a sending unit 503 for performing the above-mentioned step 321 of sending the license data generated by the license generating unit 502.

The second device 22 also comprises a unit 504 for performing the above-mentioned step 324 of sending information about the digital content ID, the third device ID and the public key of the third device.

As the explanation has already been given in the aforementioned method description, it will not be further dealt with here.

Figure 6:
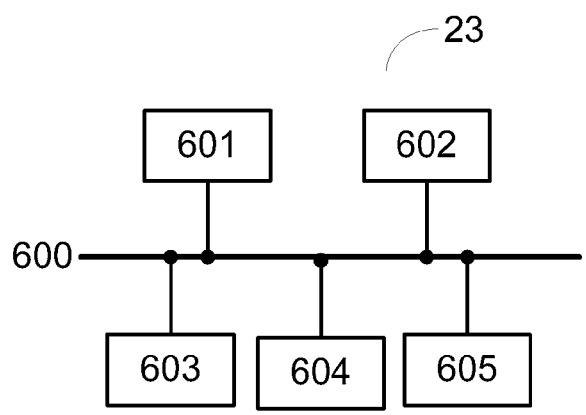
FIG. 6 is a block diagram of the third device according to the invention.

FIG. 6 shows a third device 23 for managing digital content in a digital rights management system. The digital content is encrypted with a content key by the first device 21, said content key is encrypted by said first device 21 so as to generate an encrypted content key, and said encrypted content key is sent by said first device 21 to the second device 22. Line 600 represents the data bus of the third device 23 for exchanging data.

The third device 23 comprises a sending unit 601 for performing the afore-mentioned step 330 of sending a request to use said digital content to said second device 22, and also for performing the afore-mentioned step 332 of sending a message for requesting said first device 21 to send data for decrypting said encrypted content key.

The third device 23 also comprises a receiving unit 602 for performing the afore-mentioned step 331 of receiving the above-mentioned license data from the second device 22, and also for performing the afore-mentioned step 333 of receiving data for decrypting said encrypted content key.

The receiving unit 602 may also be used to perform the above-mentioned step 334 of receiving information about the digital content ID, the third device ID and the public key of said third device (23).

The third device 23 also comprises a unit 605 for sending, to said first device 21, a message for requesting said first device 21 to send data for decrypting said encrypted content key.

The third device 23 also comprises a DRM agent 603 for decrypting the digital content using the encrypted content key included in the license data and received data for decrypting the encrypted content key. As mentioned above, when the encrypted digital content is input to the DRM agent 603, the DRM agent 603 seeks the license data to derive the encrypted content key, and requests data from the first device 21 for decrypting the encrypted content key. After receiving the data for decrypting the content key, the DRM agent 603 can decrypt the encrypted digital content and send the clean digital content to the rendering unit 604 for rendering. The rendering unit, for example, Windows media player, is used to render the digital content.

As the explanation has already been given in the aforementioned method description, it will not be further dealt with here.

It is to be understood that the above description is just an example and that it is very illustrative. The example cannot be deemed as limiting the present invention.

There are numerous ways of implementing functions by means of items of hardware or software, or both. In this respect, the drawings are also very illustrative, each representing only one possible embodiment of the invention. For example the above-mentioned packaging unit 401 can be implemented by a memory stored with instruction data, and so can the encrypting unit 402, the sending units 403 and 405, the receiving unit 404, the receiving unit 501, the license generating unit 502, the sending units 503 and 504, the sending units 601 and 605, the receiving unit 602, the DRM agent 603, and the rendering unit 604. All of them can be implemented separately by a memory with specific instruction data.

The packaging unit 401, the encrypting unit 402, the sending units 403 and 405, and the receiving unit 404 can be implemented by one or a plurality of memories stored with different instruction codes. These units may also be implemented by one or a plurality of printed circuit boards or by one or a plurality of processors.

Similarly, the receiving unit 501, the license generating unit 502, and the sending units 503 and 504 may be implemented by one or a plurality of memories stored with different instruction codes. These units may also be implemented by one or a plurality of printed circuit boards or by one or a plurality of processors.

The sending units 601 and 605, the receiving unit 602, the DRM agent 603, and the rendering unit 604 may be implemented by one or a plurality of memories stored with different instruction codes. These units may also be implemented by one or a plurality of printed circuit boards or by one or a plurality of processors.

The remarks made hereinbefore demonstrate that the detailed description with reference to the drawings illustrates rather than limits the invention. There are numerous alternatives which are within the scope of the appended claims. Any reference sign in a claim should not be construed as limiting the claim. Use of the verb "comprise" and its conjugations does not exclude the presence of elements or steps other than those stated in a claim. The indefinite article "a" or "an" preceding an element or step does not exclude the presence of a plurality of such elements or steps.

The invention claimed is:

1. A method of managing digital content, said digital content being encrypted with a content key before sending said digital content to a third device, the method comprising:
   encrypting said content key by a first device to generate an encrypted content key;
   sending said encrypted content key by said first device to a second device that is not given the ability to decrypt said key for inclusion in license data to be sent by said second device to the third device in response to a request from said third device to use said digital content, said license data describing the rights to use said digital content by said third device; and
   said first device effecting decryption of said encrypted content key when said key is received by said third device from said second device.

2. A method according to claim 1 where said first device effects said decryption of said encrypted content key by:
   decrypting said encrypted content key for said third device; or
   sending to said third device data for decrypting said encrypted content key.

3. A method according to claim 1 including receiving by said first device information from said second device identifying said digital content, identifying said third device and including a public key of said third device.

4. A method of managing digital content, said digital content being encrypted with a content key before sending said digital content to a third device, said content key being encrypted by a first device to generate an encrypted content key, the method comprising:
   receiving by a second device the encrypted content key from said first device, said second device not being given the ability to decrypt said content key;

sending by said second device to the third device license data describing the rights to use said digital content by said third device, in response to a request from said third device to use said digital content, said license data including said encrypted content key; and sending by said second device to said first device information verifying that said third device is authorized to receive from said first device information effecting decrypting of said encrypted content key.

5. A method according to claim 4 where said verifying information comprises information from said second device identifying said digital content, identifying said third device and including a public key of said third device.

6. A method of managing digital content, said digital content being encrypted with a content key before sending said digital content to a third device, said content key being encrypted by a first device to generate an encrypted content key, said encrypted content key being sent by said first device to a second device that is not given the ability to decrypt said content key, the method comprising:

sending to said second device by said third device a request to use said digital content;

receiving by said third device, from said second device, license data describing rights to use said digital content by said third device, said license data including said encrypted content key;

receiving by said third device, from said first device, decryption information comprising a decryption of said encrypted content key or data for decrypting said encrypted content key.

7. A method according to claim 6 where said decryption information is sent by said first device in response to a request by said third device.

8. A method according to claim 7 where said request by said third device includes information from said second device device verifying that said third device is authorized to receive said decryption information.

9. A first device for managing digital content, said digital content being encrypted with a content key before sending said digital content to a third device, said first device comprising:

a unit for encrypting said content key to generate an encrypted content key;

a unit for sending said encrypted content key to a second device that is not given the ability to decrypt said content key for inclusion in license data to be sent by said second device to said third device in response to a request from said third device to use said digital content, said license data describing rights to use said digital content by said third device; and a unit for effecting decryption of said encrypted content key when received by said third device from said second device.

10. A first device according claim 9 where said unit for effecting decryption of said encrypted content key:

decrypts said encrypted content key for said third device; or sends to said third device data for decrypting said encrypted content key.

11. A first device according to claim 9 comprising a unit for receiving information from said second device verifying that said third device is authorized to have a decryption of said encrypted content key.

12. A second device for managing digital content, said digital content being encrypted with a content key before sending said digital content to a third device, said content key being encrypted by a first device to generate an encrypted content key, the second device not being given the ability to decrypt said content key, but comprising:

a unit for receiving the encrypted content key from said first device, but not being given the ability to decrypt said content key;

a unit for generating license data describing rights to use said digital content by said third device, in response to a request from said third device to use said digital content, said license data including said encrypted content key;

a unit for sending said license data to said third device; and a unit for sending information to at least one of said first device and said third device verifying that said third device is authorized to receive from said first device information effecting decryption of said encrypted content key.

13. A second device according to claim 12 where said verifying information comprises information from said second device identifying said digital content, identifying said third device and including a public key of said third device.

14. A third device for managing digital content, said digital content being encrypted with a content key before being received by said third device, said content key being encrypted by a first device to generate an encrypted content key, said encrypted content key being sent by said first device to a second device that is not given the ability to decrypt said content key, said third device comprising:

a unit for sending a request to use said digital content to said second device;

a unit for receiving from said second device license data describing rights to use said digital content by said third device, said license data including said encrypted content key, and for receiving from said first device decryption information comprising a decryption of said encrypted content key or data for decrypting said encrypted content key.

15. A third device according to claim 14 comprising a DRM agent for decrypting the digital content, said DRM agent including a decryption unit for decrypting said content key encrypted by said first device.

* * * * *